US012803048B2

(12) United States Patent
Kitamura

(10) Patent No.: US 12,803,048 B2
(45) Date of Patent: Nov. 17, 2026

(54) METHOD FOR MANUFACTURING SULFIDE-BASED SOLID ELECTROLYTE POWDER

(71) Applicant: AGC Inc., Tokyo (JP)

(72) Inventor: Riku Kitamura, Tokyo (JP)

(73) Assignee: AGC Inc., Tokyo (JP)

( * ) Notice: Subject to any disclaimer, the term of this patent is extended or adjusted under 35 U.S.C. 154(b) by 419 days.

(21) Appl. No.: 18/619,280

(22) Filed: Mar. 28, 2024

(65) Prior Publication Data

US 2024/0243349 A1 Jul. 18, 2024

Related U.S. Application Data

(63) Continuation of application No. PCT/JP2021/045224, filed on Dec. 8, 2021.

(30) Foreign Application Priority Data

Sep. 30, 2021 (JP) ................................ 2021-161523

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 2016/0190637 A1 | 6/2016 | Sugiura et al. |
| 2020/0243901 A1 | 7/2020 | Kintsu |
| 2022/0344703 A1 | 10/2022 | Kimpara et al. |
| 2025/0364592 A1 | 11/2025 | Kimpara et al. |

FOREIGN PATENT DOCUMENTS

| | | | |
|---|---|---|---|
| JP | 2008-4459 A | 1/2008 |
| JP | 2013-211238 A | 10/2013 |
| JP | 2020-75855 A | 5/2020 |
| JP | 2020-119845 A | 8/2020 |
| WO | WO 2021/054433 A1 | 3/2021 |

OTHER PUBLICATIONS

International Search Report issued Feb. 22, 2022 in PCT/JP2021/045224 filed on Dec. 8, 2021, 3 pages.
Extended European Search Report issued Dec. 1, 2025, in corresponding European Patent Application No. 21959503.0, 11 pages.

*Primary Examiner* — Carlos Barcena
(74) *Attorney, Agent, or Firm* — Oblon, McClelland, Maier & Neustadt, L.L.P.

(57) ABSTRACT

The present invention relates to a method for manufacturing a sulfide solid electrolyte powder, the method including, in this order: obtaining a sulfide solid electrolyte containing at least one of a crystal phase and an amorphous phase which contain Li, P, and S; pulverizing the sulfide solid electrolyte to obtain a powder; and heating and drying the powder in an atmosphere with a dew point of −60 °C to −40 °C, in which the pulverization is performed by using a non-aqueous organic solvent, and when a concentration of moisture contained in the non-aqueous organic solvent in the pulverization is x (ppm), and a moisture concentration in a heating space in the heating and drying is y (g/m$^3$), $y<0.00085x+0.056$, and $30<x\leq170$ are satisfied.

5 Claims, No Drawings

METHOD FOR MANUFACTURING SULFIDE-BASED SOLID ELECTROLYTE POWDER

CROSS-REFERENCE TO RELATED APPLICATIONS

This is a continuation of International Application No. PCT/JP2021/045224 filed on Dec. 8, 2021, and claims priority from Japanese Patent Application No. 2021-161523 filed on Sep. 30, 2021, the entire content of which is incorporated herein by reference.

TECHNICAL FIELD

The present invention relates to a method for manufacturing a sulfide solid electrolyte powder to be used for a lithium-ion secondary battery.

BACKGROUND ART

Lithium-ion secondary batteries are widely used for a portable electronic device such as a mobile phone and a notebook computer.

In the related art, a liquid electrolyte has been used in a lithium-ion secondary battery, but there is a concern of liquid leakage, ignition, and the like, and it has been necessary to increase the size of a case for safety design. It has also been desired to improve the shortage of battery life and the narrow operating temperature range.

In contrast, attention has been paid to an all-solid-state lithium-ion secondary battery in which a solid electrolyte is used as an electrolyte of a lithium-ion secondary battery, from the viewpoint of improving safety, charging and discharging at a high speed, and reducing the size of the case.

The solid electrolytes are roughly classified into sulfide solid electrolytes and oxide solid electrolytes. Sulfide ions constituting the sulfide solid electrolytes have higher polarizability and higher lithium ion conductivity than those of oxide ions constituting the oxide solid electrolytes. As the sulfide solid electrolytes, LGPS crystals such as $Li_{10}GeP_2S_{12}$, argyrodite crystals such as $Li_6PS_5Cl$, LPS crystallized glass such as $Li_7P_3S_{11}$ crystallized glass, and the like have been known.

When the sulfide solid electrolyte is applied to a lithium-ion secondary battery to form a cell, the sulfide solid electrolyte is often pulverized to form a sulfide solid electrolyte powder. Specifically, the pulverized sulfide solid electrolyte powder is dispersed in a dispersion medium to form a slurry, followed by sheet coating to form a sheet and then, the sheet is sintered to form a sulfide solid electrolyte layer.

When the sulfide solid electrolyte is pulverized to form a powder, the sulfide solid electrolyte powder is required to be atomized from the viewpoint of contactability with active materials of a positive electrode and a negative electrode. In this regard, Patent Literature 1 discloses that sulfide solid electrolyte fine particles having an average particle diameter of 0.1 μm to 10 μm can be obtained by multistage pulverization of coarse particles of a sulfide solid electrolyte in a non-aqueous solvent.

CITATION LIST

Patent Literature

Patent Literature 1: JP2008-004459A

SUMMARY OF INVENTION

Technical Problem

In view of a tendency of the sulfide solid electrolyte to react with moisture and deteriorate, the lower the moisture concentration in a non-aqueous organic solvent when the sulfide solid electrolyte is pulverized in the non-aqueous organic solvent, the better. Similarly, the lower the moisture concentration in a subsequent heating and drying step, the better. For example, it is desirable that a dew point be around −70 °C or lower.

However, in the case where the sulfide solid electrolyte powder is mass-manufactured, a scale of a container becomes large, making it difficult to maintain high airtightness, particularly during heating and drying. As a result, a dew point of a heating space during the heating and drying may not be maintained low, and for example, the dew point may be a temperature of about −60 °C or higher.

In the case in which the dew point of the heating space increases, even when the moisture concentration in the non-aqueous organic solvent at the time of pulverizing the sulfide solid electrolyte is lowered, the sulfide solid electrolyte reacts with the moisture and deteriorates at the time of the heating and drying, and lithium ion conductivity of the sulfide solid electrolyte powder decreases.

Therefore, an object of the present invention is to provide a method for manufacturing a sulfide solid electrolyte powder capable of preventing a decrease in lithium ion conductivity even in the case where a dew point of a heating space during heating and drying is high.

Solution to Problem

As a result of intensive studies, the present inventor has found that when the moisture concentration in the non-aqueous organic solvent at the time of pulverizing the sulfide solid electrolyte is too low, the lithium ion conductivity of the sulfide solid electrolyte powder that is obtained in the subsequent heating and drying in an atmosphere with a high dew point decreases. It is considered that this is because, the lower the moisture concentration in the non-aqueous organic solvent present together with the pulverized powder, the more moisture in the heating space moves into the non-aqueous organic solvent in an attempt to maintain an equilibrium state, which causes the sulfide solid electrolyte to react with the moisture and deteriorate.

On the other hand, the present inventor has found that, by setting the moisture concentration in the non-aqueous organic solvent at the time of pulverization to a certain level or more, the movement of the moisture in the heating space into the non-aqueous organic solvent can be prevented during the heating and drying, and as a result, the above problem can be solved, and the present invention has been completed.

That is, the present invention relates to the following [1] to [5].

[1] A method for manufacturing a sulfide solid electrolyte powder to be used for a lithium-ion secondary battery, the method including, in this order:

obtaining a sulfide solid electrolyte containing at least one of a crystal phase and an amorphous phase which contain Li, P, and S;

pulverizing the sulfide solid electrolyte to obtain a powder; and heating and drying the powder in an atmosphere with a dew point of −60 °C to −40 °C, in which the pulverization is performed by using a non-aqueous organic solvent, and when a concentration of moisture contained in the non-aqueous organic solvent used in the pulverization is x (ppm), and a moisture concentration in a heating space in the heating and drying is y ($g/m^3$), the following relationships are satisfied:

$$y < 0.00085x + 0.056,$$

and $$30 < x \leq 170.$$

[2] The method for manufacturing a sulfide solid electrolyte powder according to the [1], in which the concentration of the moisture contained in the non-aqueous organic solvent is 50 ppm to 150 ppm.

[3] The method for manufacturing a sulfide solid electrolyte powder according to the [1] or [2], in which the at least one of the crystal phase and the amorphous phase further contains Ha, and the Ha is at least one element selected from the group consisting of F, Cl, Br, and I.

[4] The method for manufacturing a sulfide solid electrolyte powder according to any one of the [1] to [3], in which the crystal phase includes an argyrodite crystal structure.

[5] The method for manufacturing a sulfide solid electrolyte powder according to any one of the [1] to [4], in which the heating and drying is performed at a temperature of 100 °C or higher.

Advantageous Effects of Invention

According to the present invention, it is possible to obtain a sulfide solid electrolyte powder in which a decrease in lithium ion conductivity is prevented even in the case where a dew point of a heating space is as high as −60 °C or higher at the time of heating and drying after a sulfide solid electrolyte is pulverized. Therefore, in the case in which the sulfide solid electrolyte is mass-manufactured at the time of application to a lithium-ion secondary battery, even when it is difficult to maintain high airtightness particularly during the heating and drying, high lithium ion conductivity can be maintained. Accordingly, it is expected that battery characteristics of the lithium-ion secondary battery can be improved.

DESCRIPTION OF EMBODIMENTS

Hereinafter, the present invention will be described in detail, but the present invention is not limited to the following embodiments, and can be freely modified and implemented without departing from the gist of the present invention. In addition, the symbol "–" or the word "to" that is used to express a numerical range includes the numerical values before and after the symbol or the word as the lower limit value and the upper limit value of the range, respectively.

In this specification, ppm means mass ppm.

The non-aqueous organic solvent in this specification means a non-aqueous liquid medium for dispersing a sulfide solid electrolyte powder therein instead of a non-aqueous medium for dissolving the sulfide solid electrolyte powder.

<Method for Manufacturing Sulfide Solid Electrolyte Powder>

A method for manufacturing a sulfide solid electrolyte powder according to the present embodiment (hereinafter, may be simply referred to as a solid electrolyte powder) includes the following steps 1 to 3 in this order. The obtained sulfide solid electrolyte powder is used in a lithium-ion secondary battery.

(Step 1) a step of obtaining a sulfide solid electrolyte containing at least one of a crystal phase and an amorphous phase which contain Li, P, and S;

(Step 2) a step of pulverizing the sulfide solid electrolyte obtained in step 1 to obtain a powder; and (Step 3) a step of heating and drying the powder obtained in step 2 in an atmosphere with a dew point of −60 °C to −40 °C The pulverization in step 2 is performed by using a non-aqueous organic solvent.

When a concentration of moisture contained in the non-aqueous organic solvent used in the pulverization in step 2 is x (ppm), and a moisture concentration in a heating space in the heating and drying in step 3 is y ($g/m^3$), the following relationships are satisfied.

$$y < 0.00085x + 0.056$$

$$30 < x \leq 170$$

Hereinafter, steps 1 to 3 will be described in this order.

(Step 1)

A method in a step according to the related art can be applied to the step of obtaining a sulfide solid electrolyte containing at least one of a crystal phase and an amorphous phase which contain Li, P, and S.

In one embodiment, it is preferable to include a step of mixing raw materials to obtain a raw material mixture containing Li, P, and S, a step of reacting the raw material mixture, and a step of crystallization or amorphization.

The step of reacting the raw material mixture may be a heating reaction or a mechanochemical reaction. The raw material mixture may be crystallized by heating, and in that case, a separate step of crystallization or amorphization may not be included.

In addition to obtaining a crystal phase or an amorphous phase by crystallization or amorphization as described above in step 1, a step of increasing a degree of crystallinity and a step of rearranging crystals may be included.

Although the raw materials vary depending on compositions of a desired crystal phase or amorphous phase, in the case where it is desired to obtain an argyrodite crystal phase containing Ha or LPS crystallized glass containing Ha, a raw material containing Ha in addition to Li, P, and S is selected. Ha is at least one element selected from the group consisting of F, Cl, Br, and I.

In order to obtain an argyrodite crystal structure, Ha more preferably contains at least one of Cl and Br, still more preferably contains Cl, and yet still more preferably elemental Cl or a mixture of Cl and Br.

Examples of a compound containing Li include lithium compounds such as lithium sulfide ($Li_2S$), lithium oxide ($Li_2O$), lithium carbonate ($Li_2CO_3$), lithium hydroxide (LiOH), and lithium sulfate ($Li_2SO_4$), and an elemental lithium metal.

Examples of a compound containing P include phosphorus sulfides such as phosphorus trisulfide ($P_2S_3$) and phosphorus pentasulfide ($P_2S_5$), phosphorus compounds such as lithium phosphate ($LiPO_3$, $Li_4P_2O_7$, and $Li_3PO_4$) and sodium phosphate ($NaPO_3$, $Na_4P_{207}$, and $Na_3PO_4$), and elemental phosphorus.

Examples of a compound containing S include lithium sulfide ($Li_2S$), phosphorus sulfides ($P_2S_3$ and $P_2S_5$), and hydrogen sulfide ($H_2S$), and elemental sulfur may also be used.

Among compounds containing Ha, examples of a compound containing Cl (chlorine) include lithium chloride (LiCl), phosphorus trichloride ($PCl_3$), phosphorus pentachloride ($PCl_5$), diphosphorus tetrachloride ($P_2Cl_4$), phosphoryl chloride ($POCl_3$), sulfur dichloride ($SCl_2$), disulfur dichloride ($S_2C_{12}$), sodium chloride (NaCl), and boron trichloride ($BCl_3$).

Among the compounds containing Ha, examples of a compound containing Br (bromine) include lithium bromide (LiBr), phosphorus tribromide ($PBr_3$), phosphoryl bromide ($POBr_3$), disulfur dibromide ($S_2Br_2$), sodium bromide (NaBr), and boron tribromide ($BBr_3$).

Among the above, in the case where it is desired to obtain an argyrodite crystal, a combination of lithium sulfide, a phosphorus sulfide, and at least one of lithium chloride and lithium bromide is preferable. Further, even in the case other than the argyrodite crystal, when a Li—P—S-Ha composition is contained, a combination of lithium sulfide, a phosphorus sulfide, and at least one of lithium chloride and lithium bromide is preferable.

These raw materials may be very unstable in the air, may react with water and decomposed, and may generate hydrogen sulfide gas or be oxidized. Therefore, the raw materials are preferably mixed in an inert atmosphere.

For mixing of the raw materials, for example, mixing using a medium, such as a planetary ball mill, and medium-less mixing such as a pin mill, a powder stirrer, and air flow mixing, can be employed. The raw materials may be made amorphous by mixing before heating.

A raw material mixture containing Li, P, S, and optionally Ha can be crystallized or amorphized by a heating reaction in which the raw material mixture is heated to melt and then cooled. Further, the raw material mixture may be crystallized or amorphized by a mechanochemical reaction, such as crystallization by heating.

In the case where the raw materials are crystallized or amorphized by heating and melting and cooling, a state of a crystal can be adjusted by changing cooling conditions such as a cooling rate and pressure during the cooling.

As conditions for heating and melting, a known condition according to the related art can be applied. For example, the heating temperature is preferably 600 °C. to 900 °C. The time for the heating and melting is preferably 0.1 hours to 10 hours. The pressure during the heating and melting is preferably normal pressure to slightly pressurized. The dew point during the heating and melting is preferably −20 °C or lower, and a lower limit thereof is not particularly limited, but is usually about −80 °C. Further, the oxygen concentration is preferably 1,000 ppm or less.

For example, the crystallization may be performed by rapidly cooling the heated and melted raw material mixture at a cooling rate of 1 °C/sec or more under a normal pressure. After that, a heat treatment may be further performed to perform a stabilization treatment. Further, an amorphous raw material mixture may be obtained by the rapid cooling, which may be used as it is. Furthermore, the amorphous raw material mixture may be heated again to crystalize and then, used.

In the case where the raw material mixture is crystallized or amorphized by heating, as a heating condition, a condition in a step according to the related art can be applied. Examples of the heating atmosphere include an inert gas atmosphere, a hydrogen sulfide gas atmosphere, a sulfur gas atmosphere, and a vacuum sealed tube. The heating temperature is preferably 200 °C or higher and lower than 600 °C. The heating time is preferably 1 hour to 100 hours.

(Step 2)

In step 2, the sulfide solid electrolyte obtained in step 1 is pulverized to obtain a powder. The pulverization is performed by wet pulverization using a non-aqueous organic solvent.

In the case where the sulfide solid electrolyte is mass-manufactured, a large amount of non-aqueous organic solvent is required, which makes dehydration difficult, and a large solvent tank tends to result in poor airtightness. Specifically, at the time of the mass-manufacturing of the sulfide solid electrolyte, several tons of non-aqueous organic solvent is required, it is difficult to dehydrate such a large amount of non-aqueous organic solvent at a high level, and it is also difficult to ensure airtightness of a container after dehydration. Therefore, the concentration x of the moisture contained in the non-aqueous organic solvent to be used is more than 30 ppm.

Since the dew point of the heating space in which the heating and drying is performed in step 3 following step 2 is as high as −60 °C or higher, the lower the moisture concentration in the non-aqueous organic solvent present together with the pulverized powder, the more moisture in the heating space moves into the non-aqueous organic solvent in the attempt to maintain the equilibrium state of the moisture concentration in the heating space. From the viewpoint of preventing the sulfide solid electrolyte from reacting with moisture and deteriorating due to the movement of the moisture into the non-aqueous organic solvent, the concentration x of the moisture contained in the non-aqueous organic solvent is preferably 50 ppm or more, more preferably 60 ppm or more, and still more preferably 70 ppm or more.

From the viewpoint of preventing the sulfide solid electrolyte from reacting with water to reduce lithium ion conductivity during the pulverization of the sulfide solid electrolyte, the moisture concentration x is 170 ppm or less, preferably 150 ppm or less, more preferably 120 ppm or less, and still more preferably 100 ppm or less.

Since the sulfide solid electrolyte powder has a property of being easily charged with static electricity, mass manufacturability is reduced in terms of handling. On the other hand, by setting the moisture concentration x in the non-aqueous organic solvent to more than 30 ppm, generation of static electricity in the sulfide solid electrolyte powder is prevented and handleability is improved. From such a viewpoint, the lower limit of the concentration x of the moisture contained in the non-aqueous organic solvent is preferably within the above range.

A known method according to the related art can be applied to adjustment of the moisture concentration of the non-aqueous organic solvent. Examples thereof include a method in which a moisture absorbing and desorbing agent having a known moisture absorption and desorption amount is immersed in an organic solvent and stirred overnight, a method in which a non-aqueous organic solvent having a moisture concentration different from that of the non-aqueous organic solvent by 10 ppm or more is separately prepared and mixed for use, and a method in which a non-aqueous organic solvent is distilled to adjust the moisture concentration. Among these, it is preferable to adjust the moisture concentration by separately preparing and mixing a non-aqueous organic solvent having a moisture concentration different from that of the non-aqueous organic solvent by 10 ppm or more.

A type of the non-aqueous organic solvent is not particularly limited, and examples thereof include a hydrocarbon-based solvent, an organic solvent containing a hydroxy group, an organic solvent containing an ether group, an organic solvent containing a carbonyl group, an organic solvent containing an ester group, an organic solvent containing an amino group, an organic solvent containing a formyl group, an organic solvent containing a carboxy group, an organic solvent containing an amide group, an organic solvent containing a benzene ring, an organic solvent containing a mercapto group, an organic solvent containing a thioether group, an organic solvent containing a thioester group, an organic solvent containing a disulfide group, and a halogenated alkyl.

Examples of the hydrocarbon-based solvent include cyclohexane, heptane, octane, and toluene, and cyclohexane, heptane, and octane are preferred from the viewpoint of a low saturated moisture concentration. Further, from the viewpoint of adjusting the moisture concentration, it is also preferable to use a mixed solvent in which these hydrocarbon-based solvents are mixed with toluene, dibutyl ether, or the like.

The moisture concentration in the non-aqueous organic solvent can be measured by a coulometric titration method using Carl Fischer, and for example, a moisture measuring apparatus CA-310 manufactured by Nittosciko Analytech Co., Ltd. or the like can be used.

The particle diameter $D_{50}$ of the pulverized powder is preferably 1.5 μm or less, more preferably 1.3 μm or less, and still more preferably 1.1 μm or less, from the viewpoint of contactability with an active material of a positive electrode or a negative electrode, when the pulverized powder is applied to a lithium-ion secondary battery. Further, from the viewpoint of the handleability, the particle diameter $D_{50}$ of the pulverized powder is preferably 0.6 μm or more, more preferably 0.7 μm or more, and still more preferably 0.8 μm or more.

The particle diameter $D_{50}$ of the obtained powder can be adjusted, for example, by changing the type of the used non-aqueous organic solvent or using a mixed solvent.

(Step 3)

In step 3, the powder obtained in step 2 is heated and dried in an atmosphere with a dew point of −60 °C to −40 °C With respect to the concentration x (ppm) of the moisture contained in the non-aqueous organic solvent used in the pulverization in step 2, the moisture concentration y (g/m$^3$) in the heating space in the heating and drying in step 3 satisfies the following relationships.

Herein, $30<x\leq170$, and $y<0.00085x+0.056$.

By satisfying the above relationships, even in the case where the dew point of the heating space in step 3 is relatively high at −60 °C. to −40 °C, the movement of the moisture into the non-aqueous organic solvent present together with the powder obtained in step 2 is prevented, and the reaction of the sulfide solid electrolyte powder with the water can also be prevented.

Further, the moisture concentration y (g/m$^3$) of the heating space corresponds to the dew point, and may be replaced. That is, the dew point of −60 °C is the case where the moisture concentration y is 0.019 g/m$^3$, and the dew point of −40 °C is the case where the moisture concentration y is 0.176 g/m$^3$. Therefore, the dew point of −60 °C to −40 °C of the heating space has the same meaning as the moisture concentration y of 0.019 g/m$^3$ to 0.176 g/m$^3$.

The moisture concentration y in the heating space preferably satisfies the following relationships in order to further prevent the movement of the moisture in the heating space into the non-aqueous organic solvent.

At this time, $x>50$, and $y<0.00157x-0.0595$.

The moisture concentration y of the heating space is 0.019 (corresponding to a dew point of)−60 °C or more, and is preferably 0.0351 (corresponding to a dew point of −55 °C) or more, from the viewpoint of ease of dew point control during the mass manufacture and the handleability of the sulfide solid electrolyte. Further, the moisture concentration y is 0.176 (corresponding to a dew point of −40 °C) or less, and is preferably 0.106 (corresponding to a dew point of −45 °C) or less, from the viewpoint of preventing the decrease in lithium ion conductivity.

A known method according to the related art can be applied to adjustment of the moisture concentration of the heating space or the dew point. For example, by measuring a dew point of an exhaust port of a heating unit by using a capacitance type dew point meter, the measured dew point can be regarded as a dew point of the heating unit. Further, in the case where a heating facility has a complicated structure, a local dew point of the heating unit can also be estimated by using a solid electrolyte having known properties such as lithium ion conductivity as an internal standard for a temperature and a dew point.

The temperature at which the heating and drying is performed is preferably 100 °C or higher, more preferably 150 °C or higher, still more preferably 180 °C or higher, and particularly preferably 200 °C or higher, from the viewpoint of removing the non-aqueous organic solvent from the sulfide solid electrolyte powder. Further, although there is no particular upper limit temperature as long as a quality can be maintained, from the viewpoint of a mass-manufacture apparatus, the temperature is usually 300 °C or lower.

The time for the heating and drying is preferably 0.1 hours or more, more preferably 0.5 hours or more, and still more preferably 1.0 hour or more, from the viewpoint of removing the non-aqueous organic solvent from the sulfide solid electrolyte powder. From the viewpoint of manufacturability, the time for the heating and drying is preferably 12 hours or less, more preferably 8 hours or less, and still more preferably 6 hours or less.

Although the pressure for the heating and drying is not particularly limited, the moisture concentration in the heating space may be adjusted by reducing the pressure. Further, in the case where the heating and drying is performed under reduced pressure, the non-aqueous organic solvent can be removed even when the temperature at which the heating and drying is performed is lower than the above range. For example, in the case where the pressure is $1.0\times10^{-4}$ Pa, it is preferable that the temperature at which the heating and drying is performed is preferably 70 °C or higher from the viewpoint of removing the non-aqueous organic solvent from the sulfide solid electrolyte powder. The pressure is not limited to $1.0\times10^{-4}$ Pa, and is preferably $1.0\times10^{-5}$ Pa to $1.0\times10^{-2}$ Pa, for example. Further, the heating temperature is not limited to 70 °C or higher, and is preferably 60 °C to 100 °C, for example.

In the method for manufacturing a sulfide solid electrolyte powder according to the present embodiment, in addition to steps 1 to 3, another step may be further included as long as effects of the present invention are not impaired.

In the case where another step other than steps 1 to 3 is included, when a heat treatment is performed in the other step, as in step 3, it is preferable that the heat treatment is performed in an atmosphere with a dew point of −60 °C to −40 °C, and that a moisture concentration (g/m$^3$) of the heating space is preferably a value less than (0.00085x+0.056) with respect to the concentration x (ppm) of the moisture contained in the non-aqueous organic solvent used in the pulverization of step 2 (in which x is more than 30 and 170 or less), and more preferably a value less than (0.00157x −0.0595) (in which x is more than 50).

<Sulfide Solid Electrolyte>

The sulfide solid electrolyte before being pulverized into the sulfide solid electrolyte powder, obtained by the manufacturing method according to the present embodiment, includes at least one of a crystal phase and an amorphous phase. Similarly, the sulfide solid electrolyte powder according to the present embodiment, obtained by pulverizing, heating, and drying the sulfide solid electrolyte, includes at least one of the crystal phase and the amorphous phase. Preferred embodiments to be described below regarding the sulfide solid electrolyte in the present embodiment are preferred embodiments of the sulfide solid electrolyte powder in the present embodiment.

The crystal phase or the amorphous phase is not particularly limited as long as Li, P, and S are contained, and known materials can be applied. The sulfide solid electrolyte may contain at least one of the crystal phase and the amorphous phase, and may contain both.

Among them, the at least one of the crystal phase and the amorphous phase preferably contains Ha in addition to Li, P, and S, from the viewpoint of obtaining high lithium ion conductivity. Ha is at least one element selected from the group consisting of F, Cl, Br, and I.

Examples of a crystal structure of the crystal phase include IGPS types such as $Li_{10}GeP_2S_{12}$ and $Li_{9.54}Si_{1.74}P_{1.44}S_{11.7}Cl_{0.3}$, and argyrodite types such as $Li_6PS_5Cl$ and $Li_6PS_5Cl_{0.5}Br_{0.5}$. Examples of the amorphous phase include LPS crystallized glass such as $Li_7P_3S_{11}$, and crystallized glass containing a composition containing Ha in addition to Li, P, and S. The phase structure of the crystal phase or the amorphous phase may be one type or two or more types.

In the case where the crystal phase is contained, the crystal structure preferably includes an argyrodite type, from the viewpoint of symmetry of the crystal structure. A crystal having high symmetry is preferable when the powder is molded since a lithium ion conduction path spreads in three dimensions. Further, from the viewpoint of obtaining the powder by the pulverization, the lithium ion conductivity is easily maintained, which is preferable.

In order to obtain the argyrodite crystal structure, the crystal phase contains Ha in addition to Li, P, and S. Ha more preferably contains at least one of Cl and Br, still more preferably contains Cl, and is yet still more preferably elemental Cl or the mixture of Cl and Br.

The argyrodite crystal can be defined as including Li, P, S, and Ha, and having peaks at positions of $2\theta=15.7\pm0.5°$ and $30.2\pm0.5°$ in an X-ray powder diffraction (XRD) pattern. In addition to the above peaks, the XRD pattern preferably has a peak at a position of $2\theta=18.0\pm0.5°$, and more preferably further has a peak at a position of $2\theta=25.7\pm0.5°$.

The argyrodite crystal preferably satisfies relationships of $5<a<7$, $4<b<6$ and $0<c<2$ when expressed as $Li_aPS_bHa_c$ since a crystal tends to become an argyrodite crystal. Such element ratios more preferably satisfy relationships of $5.1<a<6.3$, $4<b<5.3$, and $0.7<c<1.9$, and still more preferably satisfy relationships of $5.2<a<6.2$, $4.1<b<5.2$, and $0.8<c<1.8$.

That is, regarding a, $5<a<7$ is preferable, $5.1<a<6.3$ is more preferable, and $5.2<a<6.2$ is still more preferable. Regarding b, $4<b<6$ is preferable, $4<b<5.3$ is more preferable, and $4.1<b<5.2$ is still more preferable. Regarding c, $0<c<2$ is preferable, $0.7<c<1.9$ is more preferable, and $0.8<c<1.8$ is still more preferable. In this specification, the "element ratio" means a ratio of contents (at %) of elements.

In the case of the argyrodite crystal, a preferable crystal structure is, for example, a cubic crystal such as F-43m, and a hexagonal crystal, a tetragonal crystal, an orthorhombic crystal, a monoclinic crystal, or the like having reduced symmetry or a triclinic crystal having further reduced symmetry may exist.

In the case where Ha constituting the argyrodite crystal contains Cl and Br, a ratio represented by (x/y) is preferably 0.1 or more, more preferably 0.3 or more, and still more preferably 0.5 or more, in which x (at %) is a content of Cl and y (at %) is a content of Br in the argyrodite crystal. Further, the ratio represented by (x/y) is preferably 10 or less, more preferably 3 or less, and still more preferably 1.6 or less.

When the ratio represented by (x/y) satisfies the above range, interactions between lithium ions and halide ions are weakened, and the lithium ion conductivity of the sulfide solid electrolyte is likely to be satisfactory. This is considered to be due to an influence of a mixed anion effect, which weakens interactions between cations and anions by mixing bromide ions having an ionic radius larger than that of chloride ions. When the ratio represented by (x/y) satisfies the above range, cycle characteristics of the lithium-ion secondary battery are likely to be improved.

In the case where Ha contains Cl and Br, when a ratio of the contents (at %) of elements constituting the argyrodite crystal is expressed by $Li_a$—P—$S_b$—$Cl_{c1}$—$Br_{c2}$, c1 is preferably 0.1 or more, more preferably 0.3 or more, and still more preferably 0.5 or more. Further, c1 is preferably 1.5 or less, more preferably 1.4 or less, and still more preferably 1.3 or less. c2 is preferably 0.1 or more, more preferably 0.3 or more, and still more preferably 0.5 or more. Furthermore, c2 is preferably 1.9 or less, more preferably 1.6 or less, and still more preferably 1.4 or less.

When c1 and c2 each satisfy the above ranges, a stable argyrodite crystal can be obtained while an abundance proportion of halide ions in the crystal is optimized and the interaction between the anions and the lithium ions in the crystal is reduced. Accordingly, the lithium ion conductivity of the solid electrolyte is likely to be satisfactory. When c1 and c2 each satisfy the above ranges, the cycle characteristics of the lithium-ion secondary battery are likely to be improved.

Here, a, b, and (c1+c2) preferably satisfy the same relationships as the above-described a, b, and c.

The crystallite size of crystals constituting the crystal phase is preferably small, from the viewpoint of obtaining good lithium ion conductivity in the case where the sulfide solid electrolyte powder is used to form a sulfide solid electrolyte layer to produce a battery. Specifically, the crystallite size is preferably 1,000 nm or less, more preferably 500 nm or less, and still more preferably 250 nm or less. A lower limit of the crystallite size is not particularly limited, and the crystallite size is generally 5 nm or more.

The crystallite size can be calculated by using a half-width of a peak in the XRD pattern and a Scherrer equation.

In the crystal phase in the sulfide solid electrolyte according to the present embodiment, a counter anion is fixed in the crystal structure thereof. Further, the amorphous phase in the sulfide solid electrolyte can also form an anion structure in its structure by adjusting a composition.

The counter anion or anion structure differs depending on a structure such as a crystal structure, and examples thereof include $$PS_4^{3-}, P_2S_6^{4-}, P_2S_7^{4-},$$

$O^{2-}$, $S^{2-}$, $Se^{2-}$, $F^-$, $Cl^-$, $Br^-$ and $I^-$.

Among them, it is preferable to contain $PS_4^{3-}$ having a tetrahedral structure from the viewpoint of improvement in heat resistance of the crystal and a thermodynamically stable effect.

In the case where the argyrodite crystal is $Li_6PS_5Cl$, the counter anion constituting $Li_6PS_5Cl$ is a $$PS_4^{3-}$$

tetrahedron. In addition, examples of a crystal phase in which the counter anion is a $$PS_4^{3-}$$

tetrahedron include an LGPS crystal and LPS crystallized glass.

The structure of the counter anion contained in the crystal phase can be determined by a structural analysis performed from the XRD pattern. Further, the anion structure contained in the amorphous phase can be determined by a Raman spectroscopy or a nuclear magnetic resonance (NMR).

The sulfide solid electrolyte according to the present embodiment may contain, in addition to the crystal phase or the amorphous phase containing Li, P, and S, an anion such as the counter anion as described above and an oxide anion substituted at a site having an anion structure, $Li_3PS_4$, $Li_4P_2S_6$, $Li_2S$, LiHa (Ha is at least one halogen element selected from F, Cl, Br, and I), and the like.

The total content of elements constituting the crystal phase and the amorphous phase containing Li, P, and S in the sulfide solid electrolyte is preferably 60 mass % or more, more preferably 80 mass % or more, and still more preferably 90 mass % or more, from the viewpoint of achieving high lithium ion conductivity. An upper limit of the total content is not particularly limited, and may be 100 mass %. Further, in the case where two or more kinds of crystal phases and amorphous phases are present, a total of these is preferably in the above range.

The total content of the elements constituting the crystal phase and the amorphous phase can be determined by a composition analysis using ICP emission spectrometry, atomic absorption, ion chromatography, or the like. A proportion of the crystal phase can be calculated by adding an internal standard substance, performing a measurement by XRD or neutral-beam scattering, and then comparing peak intensity with the internal standard substance.

(Lithium-Ion Secondary Battery)

The sulfide solid electrolyte according to the present embodiment has a high lithium ion conductivity because the reaction with the moisture is prevented when used in a lithium-ion secondary battery. Further, the generation of the static electricity is prevented, and the handleability is also excellent.

The sulfide solid electrolyte powder according to the present embodiment can prevent the decrease in lithium ion conductivity, in the case where it is difficult to maintain high airtightness particularly during the heating and drying and difficult to maintain low dew point of the heating space as the scale of the container increases at the time of mass-manufacturing. Therefore, it is sufficient that the lithium ion conductivity is higher than that of a sulfide solid electrolyte powder obtained by pulverizing the sulfide solid electrolyte prepared under the same conditions by using a non-aqueous organic solvent having a moisture concentration x of 30 ppm or less in step 2 and heating and drying the pulverized product in a heating space having a dew point of −60 °C or higher in step 3, or that of a sulfide solid electrolyte powder obtained under conditions such that a value expressed by $(0.00085x+0.056)$ described above is equal to or less than the moisture concentration y ($g/m^3$) in the heating space in the heating and drying in step 3. Specific lithium ion conductivity varies depending on a composition of the sulfide solid electrolyte.

As another index, with respect to the sulfide solid electrolyte obtained in an environment that can be used for obtaining a sulfide solid electrolyte powder in a small scale, for example, under the same conditions, when lithium ion conductivity of a sulfide solid electrolyte powder obtained by setting the moisture concentration x of the non-aqueous organic solvent at the time of pulverization in step 2 to 20 ppm and the dew point of the heating space in step 3 to −80 °C is used as a reference (100%), the lithium ion conductivity is preferably 85% or more, more preferably 90% or more, and still more preferably 93% or more. Further, an upper limit is not particularly limited, and a higher lithium ion conductivity is preferred. The lithium ion conductivity may be 100% or more, but is usually less than 100%.

The lithium ion conductivity in this specification is a value obtained from Nyquist plot obtained by forming the sulfide solid electrolyte powder into a compacted powder body under pressure of 380 kN and measuring the compacted powder body by using an AC impedance measuring device under the following conditions: a measurement frequency: 100 Hz to 1 MHz, a measurement voltage: 100 mV, and a measurement temperature: 25 °C.

In the case where the sulfide solid electrolyte powder is used for the lithium-ion secondary battery, the sulfide solid electrolyte powder may form a solid electrolyte layer together with other components such as a binder as necessary. As the binder or other components, known substances according to the related art can be used.

The content of the sulfide solid electrolyte powder with respect to the entire solid electrolyte layer is preferably 80 mass % or more, and more preferably 90 mass % or more.

As a method for forming the solid electrolyte layer, a known method according to the related art can also be used. As an example of wet molding, the solid electrolyte layer can be formed by dispersing or dissolving the components constituting the solid electrolyte layer in a solvent to form a slurry, applying the slurry in the form of a layer, that is, a sheet, followed by drying, and then pressing the sheet as necessary. If necessary, the binder may be removed by heating. The thickness of the solid electrolyte layer can be easily adjusted by adjusting the coating amount of the slurry.

In addition, instead of the wet molding, the solid electrolyte layer may be formed by press-forming the sulfide solid electrolyte powder or the like on a surface of a positive electrode, a negative electrode, or the like by a dry method. Alternatively, the solid electrolyte layer may be formed on another base material and transferred onto the surface of the positive electrode, the negative electrode, or the like.

The sulfide solid electrolyte powder may be mixed with a positive electrode active material or a negative electrode active material to be used as a positive electrode layer or a negative electrode layer. As the positive electrode active material or negative electrode active material used for the positive electrode layer or negative electrode layer, a current collector, a binder, a conductive aid, and the like, known materials according to the related art can be used.

The lithium-ion secondary battery for which the sulfide solid electrolyte powder is used includes the solid electrolyte layer, the positive electrode layer, and the negative electrode layer.

As a material of an outer casing of the lithium-ion secondary battery, known materials according to the related art may also be used. As a shape of the lithium-ion secondary battery, known shapes according to the related art may be used, and examples of the shape of the lithium-ion secondary battery include a coin shape, a sheet shape (film shape), a folded shape, a wound cylindrical shape with a bottom, and a button shape. The shape thereof can be appropriately selected according to the application.

EXAMPLES

Hereinafter, the present invention will be described in detail with reference to Examples, but the present invention is not limited thereto.

Examples 1 to 8 are Inventive Examples, and Examples 9 to 12 are Comparative Examples. Example 13 is a sulfide solid electrolyte powder obtained in an environment that can be implemented at the time of small-scale manufacturing, and is a reference example.

Example 1

As Step 1, a lithium sulfide powder (manufactured by Sigma Corporation, purity: 99.98%), a phosphorus pentasulfide powder (manufactured by Sigma Corporation, purity: 99%), a lithium chloride powder (manufactured by Sigma Corporation, purity: 99.99%), and a lithium bromide powder (manufactured by Sigma Corporation, purity: 99.99%) were weighed such that a composition ratio be $Li_{5.3}P_{0.95}S_{4.2}Cl_{0.8}Br_{0.8}$ in a dry nitrogen atmosphere, followed by mixing at 400 rpm for 4 hours by using a planetary ball mill in the same atmosphere. Next, the mixture was vacuum-sealed in a quartz tube and heated at 450 °C for 5 hours to obtain a sulfide solid electrolyte containing an argyrodite crystal. After that, pulverization was performed in a mortar, followed by a mesh path with an opening of 44 μm, to thereby obtain a powder having a specific surface area of 0.3 $m^2/g$.

As step 2, to 2 g of the sulfide solid electrolyte obtained in step 1, 8 g of a mixed solvent of heptane (CAS No. 142-82-5) having a moisture concentration of 50 ppm and dibutyl ether (CAS No. 142-96-1)=5:3 (mass ratio) as a non-aqueous organic solvent was placed in a 45 mL sealed pot made of zirconia. A zirconia ball was further placed in this sealed pot, and the wet pulverization was performed by using a planetary ball mill (LP-M4 manufactured by Inoue Seisakusho) at 200 rpm for 45 minutes to obtain a powder.

As step 3, the obtained powder was heated and dried in a heating space having a dew point of −50 °C (moisture concentration 0.0617 $g/m^3$) and a temperature of 180 °C for 2 hours to obtain a sulfide solid electrolyte powder.

Examples 2 to 13

Sulfide solid electrolyte powders were obtained in the same manner as in Example 1, except that at least one of the moisture concentration of the non-aqueous organic solvent in step 2 and the dew point (moisture concentration) of the heating space in step 3 was changed to values shown in Table 1 for the sulfide solid electrolyte obtained in the same manner as step 1 in Example 1.

(Evaluation: Lithium Ion Conductivity)

The sulfide solid electrolyte powder was formed into a compacted powder body under pressure of 380 MPa, the compacted powder body was used as a measurement sample, and the lithium ion conductivity was measured by using an AC impedance measuring device (potentiostat/galvanostat VSP, manufactured by Bio-Logic Sciences Instruments). The measurement conditions were as follows: a measurement frequency of 100 Hz to 1 MHz, a measurement voltage of 100 mV, and a measurement temperature of 25 °C A ratio of the lithium ion conductivity of the sulfide solid electrolyte powder when a value of the lithium ion conductivity in Example 13 is taken as 1 is shown in "Evaluation", "$Li^+$ conductivity (ratio)" in Table 1. The lithium ion conductivity of 0.85 or more can be said good value as the electrolyte to be used for the lithium-ion secondary battery.

TABLE 1

| | Pulverizing Moisture concentration x (ppm) of non-aqueous organic solvent | Heating and drying: Dew point (°C) | Heating and drying: Moisture concentration y ($g/m^3$) of heating space | Relational expression: 0.00085x + 0.056 | Relational expression: 0.00157x − 0.0595 | Evaluation $Li^+$ conductivity (ratio) |
|---|---|---|---|---|---|---|
| Ex. 1 | 50 | −50 | 0.0617 | 0.099 | 0.019 | 0.92 |
| Ex. 2 | 60 | −60 | 0.0193 | 0.107 | 0.035 | 0.95 |
| Ex. 3 | 80 | −50 | 0.0617 | 0.124 | 0.066 | 0.93 |
| Ex. 4 | 100 | −55 | 0.0351 | 0.141 | 0.098 | 0.96 |
| Ex. 5 | 100 | −45 | 0.1060 | 0.141 | 0.098 | 0.91 |
| Ex. 6 | 130 | −50 | 0.0617 | 0.167 | 0.145 | 0.92 |
| Ex. 7 | 140 | −60 | 0.0193 | 0.175 | 0.160 | 0.97 |
| Ex. 8 | 150 | −40 | 0.1760 | 0.184 | 0.176 | 0.90 |
| Ex. 9 | 50 | −45 | 0.1060 | 0.099 | 0.019 | 0.80 |
| Ex. 10 | 100 | −40 | 0.1760 | 0.141 | 0.098 | 0.75 |

TABLE 1-continued

| | Pulverizing Moisture concentration x (ppm) of non-aqueous organic solvent | Heating and drying: Dew point (°C) | Heating and drying: Moisture concentration y (g/m$^3$) of heating space | Relational expression: 0.00085x + 0.056 | Relational expression: 0.00157x − 0.0595 | Evaluation $Li^+$ conductivity (ratio) |
|---|---|---|---|---|---|---|
| Ex. 11 | 180 | −50 | 0.0617 | 0.209 | 0.223 | 0.80 |
| Ex. 12 | 220 | −40 | 0.1760 | 0.243 | 0.286 | 0.75 |
| Ex. 13 | 20 | −80 | 0.0012 | 0.073 | −0.028 | 1.00 |

The sulfide solid electrolyte powders in Examples 1 to 8 had good handleability.

Further, from the above results, it can be found that even in the case where the moisture concentration x of the non-aqueous organic solvent in step 2 is more than 30 ppm, if the moisture concentration x is 170 ppm or less, the decrease in lithium ion conductivity can be prevented when the moisture concentration y (g/m$^3$) in the heating space in step 3 satisfies a relationship of $y<0.00085x+0.056$.

For example, when Example 5 and Example 9 in which the moisture concentrations y of the heating spaces in steps 3 are the same are compared with each other, it can be found that even though Example 9 has a lower moisture concentration x of the non-aqueous organic solvent in step 2, Example 5 satisfies the relationship of $y<0.00085x+0.056$, that is, balances the moisture concentration y of the heating space and the moisture concentration x of the non-aqueous organic solvent, and a rate of decrease in lithium ion conductivity is 9% in Example 5 and 20% in Example 9, and thus the decrease in lithium ion conductivity is significantly prevented in Example 5.

When Example 8 and Example 9 are compared, Example 9 has a lower moisture concentration x of the non-aqueous organic solvent in step 2 and a lower moisture concentration y of the heating space in step 3, which appear to more preferable conditions when considering steps 2 and 3 individually. However, a rate of the decrease in lithium ion conductivity was 10% in Example 8 and 20% in Example 9, and thus the decrease in lithium ion conductivity is significantly prevented in Example 8.

When Example 2 and Example 7 are compared, even though the moisture concentrations y are the same and Example 2 has a considerably lower moisture concentration x, the decrease in lithium ion conductivity is prevented in Example 7. This also indicates that respective good environments in step 2 and step 3 are not sufficient, and is a point worth noting.

Further, in the case where a relationship of $y<0.00157x-0.0595$ is satisfied, the decrease in lithium ion conductivity was further prevented.

Although the present invention has been described in detail with reference to specific embodiments, it is apparent to those skilled in the art that various changes and modifications can be made without departing from the spirit and scope of the present invention. The present application is based on a Japanese Patent Application (No. 2021-161523) filed on Sep. 30, 2021, and the contents thereof are incorporated herein by reference.

The invention claimed is:

1. A method for manufacturing a sulfide solid electrolyte powder to be used for a lithium-ion secondary battery, the method comprising, in this order:

obtaining a sulfide solid electrolyte containing at least one of a crystal phase and an amorphous phase which contain Li, P, and S;

pulverizing the sulfide solid electrolyte to obtain a powder; and heating and drying the powder in an atmosphere with a dew point of −60 °C to −40 °C, wherein the pulverization is performed by using a non-aqueous organic solvent, and when a concentration of moisture contained in the non-aqueous organic solvent used in the pulverization is x (ppm), and a moisture concentration in a heating space in the heating and drying is y (g/m$^3$), the following relationships are satisfied:

$$y < 0.00085x + 0.056,$$

and $$30 < x \leq 170.$$

2. The method for manufacturing a sulfide solid electrolyte powder according to claim 1, wherein the concentration of the moisture contained in the non-aqueous organic solvent is 50 ppm to 150 ppm.

3. The method for manufacturing a sulfide solid electrolyte powder according to claim 1, wherein the at least one of the crystal phase and the amorphous phase further contains Ha, and the Ha is at least one element selected from the group consisting of F, Cl, Br, and I.

4. The method for manufacturing a sulfide solid electrolyte powder according to claim 1, wherein the crystal phase includes an argyrodite crystal structure.

5. The method for manufacturing a sulfide solid electrolyte powder according to claim 1, wherein the heating and drying is performed at a temperature of 100 °C or higher.

* * * * *